US007058713B2

(12) United States Patent
Reynolds et al.

(10) Patent No.: US 7,058,713 B2
(45) Date of Patent: Jun. 6, 2006

(54) METHOD TO ASSESS THE QUALITY OF A VOICE COMMUNICATION OVER PACKET NETWORKS

(75) Inventors: Richard J B Reynolds, Ipswich (GB); Philip Gray, Ipswich (GB); Michael P Hollier, Ipswich (GB); Antony W Rix, Cambridge (GB)

(73) Assignee: British Telecommunications PLC, London (GB)

( * ) Notice: Subject to any disclaimer, the term of this patent is extended or adjusted under 35 U.S.C. 154(b) by 447 days.

(21) Appl. No.: 10/311,240

(22) PCT Filed: Jul. 2, 2001

(86) PCT No.: PCT/GB01/02961

§ 371 (c)(1),
(2), (4) Date: Dec. 17, 2002

(87) PCT Pub. No.: WO02/03633

PCT Pub. Date: Jan. 10, 2002

(65) Prior Publication Data

US 2004/0203438 A1    Oct. 14, 2004

(30) Foreign Application Priority Data

Jun. 30, 2000    (GB) .................................. 00305545

(51) Int. Cl.
*G06F 15/173* (2006.01)

(52) U.S. Cl. ...................... 709/224; 709/201; 709/203; 709/204; 709/227; 455/426.1; 455/67.11; 455/67.14; 379/88.17; 379/88.01; 379/88.04; 379/90.01; 379/93.05; 370/329; 370/352

(58) Field of Classification Search ............. 455/426.1, 455/462, 557, 67.11, 67.14; 370/352, 354, 370/401, 356, 466; 709/224, 201, 227; 379/88.17, 379/900

See application file for complete search history.

(56) References Cited

U.S. PATENT DOCUMENTS

| | | | | |
|---|---|---|---|---|
| 6,345,047 B1* | 2/2002 | Regnier | ...................... | 370/352 |
| 6,360,265 B1* | 3/2002 | Falck et al. | ................. | 709/227 |
| 6,393,494 B1* | 5/2002 | Hyder et al. | ................. | 719/321 |
| 6,446,028 B1* | 9/2002 | Wang | ......................... | 702/186 |
| 6,466,570 B1* | 10/2002 | Low et al. | .................... | 370/352 |
| 6,473,097 B1* | 10/2002 | Elliott | ......................... | 715/733 |
| 6,522,645 B1* | 2/2003 | Lee et al. | .................... | 370/352 |
| 6,711,160 B1* | 3/2004 | Chan et al. | .................. | 370/354 |
| 6,738,469 B1* | 5/2004 | Peirce et al. | ........... | 379/218.01 |

* cited by examiner

*Primary Examiner*—Marceau Milord
(74) *Attorney, Agent, or Firm*—Nixon & Vanderhye P.C.

(57) ABSTRACT

The present invention provides a test method which can determine whether a user terminal is capable of supporting a real time connection, such as a computer telephony link, with a network terminal while simultaneously supporting a connection with a WWW server.

5 Claims, 2 Drawing Sheets

METHOD TO ASSESS THE QUALITY OF A VOICE COMMUNICATION OVER PACKET NETWORKS

This application is the US national phase of international application PCT/GB01/02961 filed 2 Jul. 2001 which designated the U.S.

FIELD OF THE INVENTION

This invention relates to a test method which can used to determine whether multiple communications links can be supported by a user terminal.

BACKGROUND OF THE INVENTION

Conventional telephony services are based upon the provision of a dedicated circuit to connect two telephony users via an exchange. The set-up and maintenance of the circuit have an associated cost, but the dedicated circuit allows a guaranteed quality of service (QoS) for the telephony service provided over the circuit. In contrast, computer communications made over packet based networks do not involve the set-up and maintenance of a circuit, but instead a stream of packets are routed from one computer to a second computer. The route taken by consecutive packets, may vary according to changes in network performance, congestion, etc. One of the disadvantages of packet-based networks when compared with circuit-based networks is that there is no guarantee that all of the packets transmitted by a computer will arrive at the destination computer or that those packets that are received by the destination computer will arrive in the same order that they were transmitted. Packets can be re-transmitted following a prompt by the destination computer and the application should be capable of re-ordering the received packets into the correct sequence and these steps are of little consequence if the data being transmitted between the computers does not have any time dependence., for example a file transfer, the transmission of an email message, etc. However, if the computers are transmitting real-time data, such as telephony or audio-visual signals for example, then the reception of out of sequence packets and the failure to receive some packets in time, or not at all, may cause significant problems with the playback of the real-time data.

Despite these disadvantages, it is perceived that in the near future most high capacity communications networks will be packet-based networks which will carry all forms of data, including real-time data such as speech and video. It is currently possible to use the public Internet to carry telephony services (often referred to as computer telephony (CT), PC telephony, Internet telephony or voice over IP (VoIP)) but the relatively low bandwidth available to Internet users means that such services tend to be of low quality.

SUMMARY OF THE INVENTION

According to a first aspect of the invention there is provided a method of operating a communications network, the communications network comprising one or more network data stores, one or more network terminals and a plurality of user terminals, the method comprising the steps of: (a) establishing a first communications link between a user terminal and a first network terminal via said communications network; (b) establishing a test link between the user terminal and a second network terminal via said communications network; (c) transmitting a test signal over said test link; (d) measuring the received test signals to determine the capacity of said test link; and (e) establishing a communications link between the user terminal and the network terminal via said communications network in accordance with the result of step (d). Preferably the test link established in step (b) is a computer telephony link between the user terminal and the network-terminal and the test signal comprises speech or speech fragments. The communications link between the user terminal and the network terminal established in step (e) may be a computer telephony link.

According to a second aspect of the invention there is provided a data carrier containing computer code for loading into a computer for the performance of any of the methods as described

BRIEF DESCRIPTION OF THE DRAWINGS

The invention will now be described, by way of example only, with reference to the following figures in which.

DETAILED DESCRIPTION OF THE INVENTION

Figure 1:
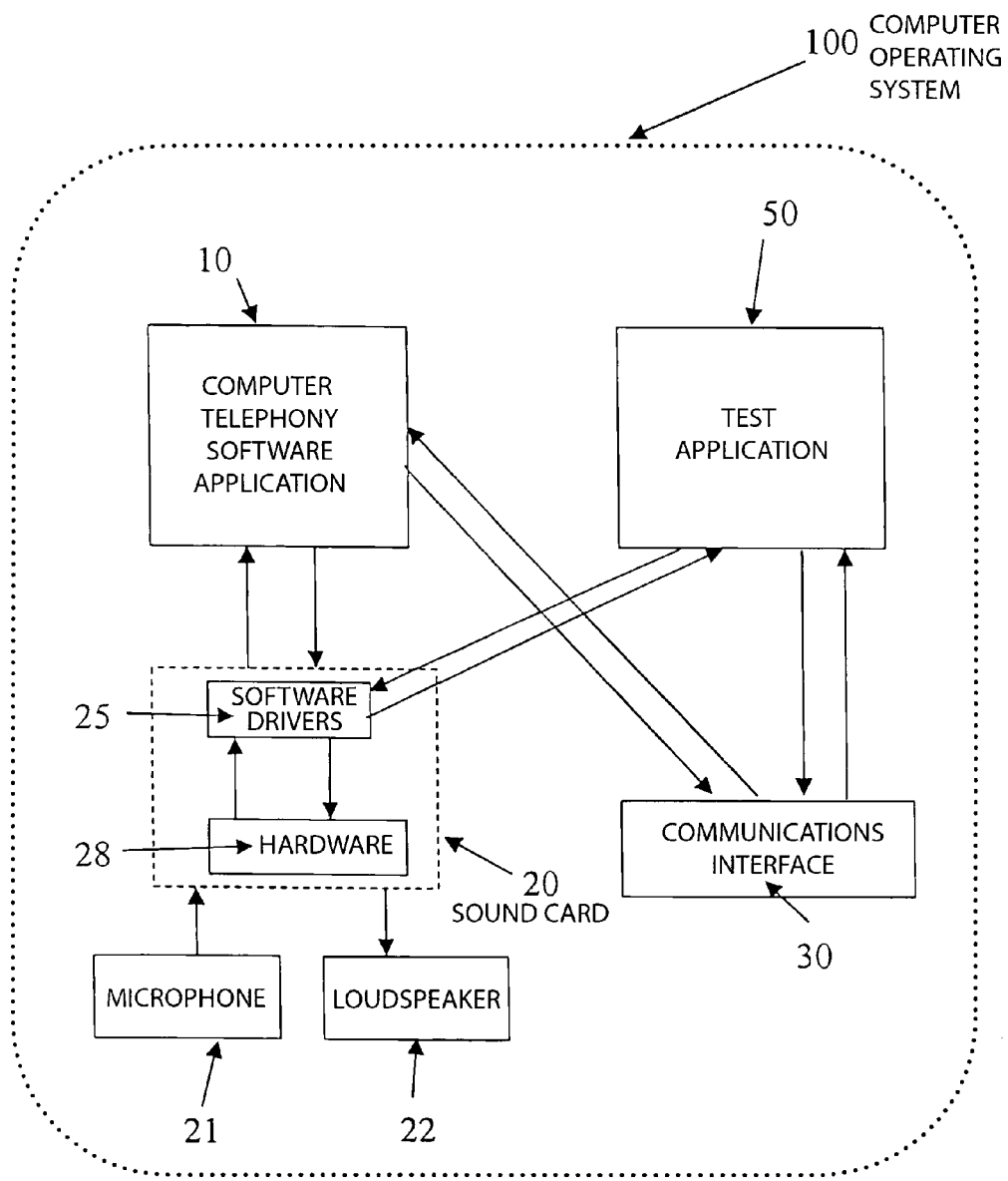
FIG. 1 shows a functional block diagram of a computer telephony terminal.

FIG. 1 shows a functional block diagram of a computer telephony terminal. The computer telephony terminal is implemented as a computer. The computer includes a central processing unit, memory and storage devices and various hardware devices such as a display unit and a keyboard. The computer has an operating system (indicated by reference numeral 100 in FIG. 1) stored in the memory and storage devices. Software applications such as a word processor application and an Internet browser may also be stored in the memory and storage devices and run under the operating system. As will now be described with reference to FIG. 1, the computer includes a software application and hardware to provide it with the functionality of a computer telephony terminal. As shown in FIG. 1, the computer telephony terminal includes a computer telephony (CT) software application 10, which is a process that is run under the computer operating system 100. The CT application is used to establish a communication link with a CT application which is being run on a second computer, which is connected to the first computer via a communications network (see FIG. 2). It is also possible for the CT application to communicate with a standard telephone which is connected to the PSTN (public switched telephony network) if there is a suitable gateway from the communications network to the PSTN. Additionally, the CT application may communicate with a so-called 'internet phone' which has the appearance and functionality of a conventional telephone but instead of connecting to, and communicating via, the PSTN such 'internet phones' are connected to the communication network and provide the same functionality as a computer running a CT application but at much reduced cost and complexity (see "*Voice-Data Convergence and the Corporate Voice-Over-IP Trial*", A Catchpole, IBTE Journal, volume 17, part 4, January 1999, pages 218–224).

The CT application 10 communicates with a CT application in another CT terminal, e.g. a personal computer or internet phone, by sending and receiving data transmission packets, the data packets containing short segments of speech. The CT application 10 communicates with the computer's soundcard 20, which is connected to a microphone 21 and a loudspeaker(s) 22 (the microphone and loudspeaker(s) may be integrated and take the form of a headset or a conventional telephony handset). The user's voice signal is captured by the microphone 21 and then the soundcard converts the analogue signal supplied by the microphone into digital voice data. This digital voice data is then sent to the CT application, which may perform some form of data modulation or compression in order to increase the efficiency of the data transmission across the network before the digital voice data is arranged into packets of a suitable size (either in terms of the number of bytes of the package or in terms of the length of speech that is represented by the digital voice data). These voice data packets are sent to the communications interface 30 such that the voice data therein may be transmitted to the destination terminal. The communications interface 30 may be a modem or terminal adaptor for remote access to a packet-based network or it may be a network card for direct access to a packet-based network. The communications interface places the voice data packets within the payload of the data transmission packets used by the communications interface, for example TCP (Transmission Control Protocol), UDP (User Datagram Protocol), etc. The data transmission packets are then routed across the communications network (see FIG. 2) to the destination terminal, where the analogue speech signal is recovered in a manner described below.

The communications interface 30 receives data transmission packets that have been sent to the computer and differentiates the data transmission packets by their content, for example part of a stream of computer telephony packets, a WWW download, an email message, etc. For CT data, the voice data packets are extracted from the payload of the data transmission packets and are then sent to the CT application 10. The CT application processes the voice data packets, ordering them in the correct sequence and demodulating (and/or decompressing) the data as necessary so that a stream of digital voice data can be sent to the soundcard 20, which converts the data from a digital signal to an analogue signal, which can then be played back to the user through the loudspeaker(s) 22.

The soundcard provides functionality using both hardware 28, which interfaces with the external hardware (loudspeakers, microphone, etc.) and the internal bus of the computer, and software drivers 25 stored in a memory device, which may be mounted on the soundcard, which allow the operating system and the applications running on the computer to access functions that cause the hardware to respond accordingly.

Test application 50 is a software process which is also running under the computer operating system in parallel with the CT application 10 and any other software applications. The test application 50 interfaces with the soundcard drivers 25 so that test signals can be injected into the digital voice data before it is passed to the CT application for onward transmission. Similarly, the test application 50 can extract test signals from received digital voice data that have been passed from the CT application to the soundcard and analyse the extracted test signals in order to determine the transmission quality.

If non-intrusive test methods are being used, i.e. if only the spectral properties of the received speech signals are being analysed, then no test signals need be injected into the digital voice data packets and the test application needs to take a copy of the digital voice data that has been sent from the CT application to the soundcard. When two computers, each arranged as shown in FIG. 1, are connected to a communications network, and a telephony link is established between the computers, it is possible to measure the quality of the telephony link. More specifically, the test application in one computer can cause test signals to be injected into voice data packets generated by the CT application, so that the voice data packets may contain only a test signal or a combination of a voice signal and a test signal. The test signal can be analysed by the test application in either computer.

As mentioned above, the test application may be used to perform both intrusive or non-intrusive tests. However, depending upon the nature of the test, intrusive tests may be unsuitable for a telephony link which is carrying real telephony traffic. If a non-intrusive test method is used, then the voice-data packets will only contain voice signals.

Figure 2:
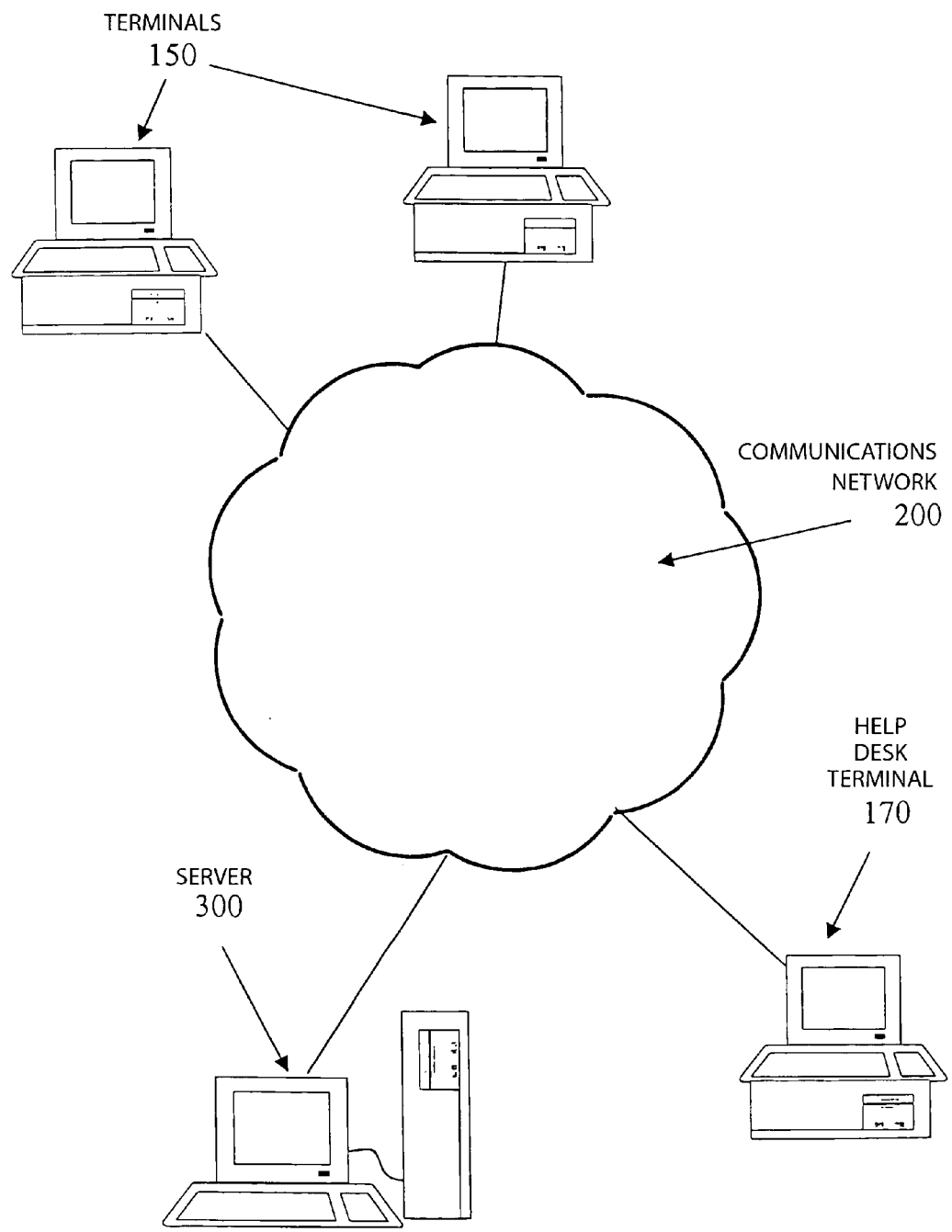
FIG. 2 shows a schematic depiction of computer telephony terminals connected to a communications network.

Referring now to FIG. 2, there is shown three client terminals 150 and a server computer 300 connected to a packet-based communications network 200. Each of the client terminals 150 takes the form of the computer telephony terminal shown in FIG. 1. Each of the client terminals 150 may be connected to the network 200 by a remote connection or by a direct connection. The server computer 300 comprises all the functionality commonly found in server computers, for example storage means to store the information resources which can be requested, a network adaptor to allow communication to and from one or more communication networks and a processor and control software to control the operation of the server and to enable the display of information resources in response to user requests.

The server computer 300 displays an information resource to a client terminal in response to a request from that client terminal, the request comprising location data, or an address, that identifies the information resource that the client terminal wishes to access. For example the server computer may be a World Wide Web (WWW) server that the client terminals are accessing using a WWW browser such as Netscape Navigator or Microsoft Internet Explorer. The server computer may display information of almost any type, for example, details and specifications of products and/or services that may be purchased through the server (or from the organisation responsible for the server) or technical information regarding the configuration of hardware or software within a personal computer. In many cases, regardless of the completeness and clarity of the information provided by the server computer, the user of the client terminal may find that some of her questions remain unanswered. In such a situation, it may be that the most appropriate course of action would be speak to a help desk operator. It is known for WWW sites to have "Call Me" buttons which, when activated, prompt a help desk operator to place a telephone call to the user of the client terminal using a telephone number which is already held by the organisation responsible for the server or which is entered in response to a prompt from the server computer.

A disadvantage of such "Call Me" functions is that many computer users currently rely on dial-up connections to the WWW that require the use of a telephone line. Thus, unless the client terminal user has a second telephone line it is not possible to simultaneously retain the connection to the server computer and talk to the help desk operator. If the information from the server can not be viewed whilst talking to the help desk operator then much of the value of having the information explained is lost as the operator can not refer the user to certain aspects of the information or various options that can be selected.

If a client terminal makes a request for a conversation with a help desk operator, the server computer forwards the request to a help desk terminal 170, which takes the form of the PC-based computer telephony terminal as shown in FIG. 1 and described above. The CT application of the help desk terminal initiates a computer telephony link with the respective client terminal, with the test application sending a series of test signals to assess the quality of the telephony link between the help desk terminal and the client terminal. The test signal may measure delay, frequency shaping, temporal clipping in the communications link. The test signals may also be used to assess speech quality using known perceptual analysis methods (see, for example, EP-B-0 647 375, EP-B-0 776 566 & EP-B-0 776567). Alternatively the test signal may be a short sample of recorded speech, or speech fragments If the analysis of the signals indicates that there is sufficient bandwidth to support simultaneous access to the WWW page(s) of interest and a CT link of adequate quality then the CT application of the help desk terminal initiates a CT link with the client terminal such that the help desk operator can engage the client terminal user in conversation whilst both parties are able to view selected WWW page(s). The CT application of both computers may be able to use a number of different codecs (coders/decoders) and the bandwidth available between the two computers may determine which codec is used. Typically a CT conversation requires approximately 16–20 kbit/s of bandwidth, so with a high-speed PSTN modem, i.e. 56 kbit/s, it should be possible to sustain a CT conversation as well as requesting WWW pages and receiving them in a reasonable time. In addition, the test application in the help desk terminal may interrogate the client terminal to ensure that it has sufficient processing power (i.e. speed of processor and available memory) to be able to support the CT application as well as the other processes which are being run on the client terminal. While this may not be an issue for modern PCs as processor speeds are now approaching 2 GHz, older PCs and other devices used to access the WWW, such as set top boxes, games consoles, personal digital assistants (PDAs), third generation mobile telephones etc., may have problems.

If the test application indicates that there is insufficient bandwidth, or that the client terminal is in some way inadequate to enable a CT conversation to be initiated then the help desk terminal does not initiate a CT conversation. Alternative communication routes may be set up, e.g. prompting for an alternative telephone number to call (either for a different PSTN connection or for a cellular phone) or initiating a lower-bandwidth, interactive communication session e.g. using a chat room, or some form of text messaging.

In the above discussion references are made to either the server or the help desk terminal initiating an action or prompting a response. It should be understood that either of these entities could perform the above actions, either in response to a prompt from the other entity or from the client terminal. Also, the test application might only reside in the client terminal but could be used to test the quality of the link between the help desk terminal and the client terminal, with the analysis of the data being reported to the help desk terminal. If the server and the help desk function (typically there will be a call centre which comprises many terminals) are being operated by the same organisation then the server and the help desk terminal may be co-located and they may share the same access point to the internet. In this case it may be possible to measure the quality of a CT link between the server and the client terminal and assume that a link between the help desk terminal and the client terminal would be of equivalent quality.

It will be readily understood that the principle outlined above may be readily applied to the use of video telephony, as long as both the client terminal and the help desk terminal are equipped with some form of camera, for example a webcam or a video camera/recorder with an interface to a PC, and that the client terminal has a sufficiently fast connection to the WWW such as a cable modem or some from of DSL (digital subscriber loop) connection.

It should be understood that although the above discussion has focused upon the use of a personal computer capable of running both a WWW browser and a computer telephony application, the invention can also be implemented into other devices which can be used to access the WWW, such as set top boxes for the delivery of advanced television services, games consoles, PDAs or similar mobile terminals etc. Software suitable for carrying out the method of the present invention (and thus transforming a suitable PC, or other device, into apparatus according to the present invention) may be supplied on conventional computer media, e.g. floppy disk, CD-ROM, DVD, etc., or over a computer or communications network.

What is claimed is:

1. A method of operating a communications network, the communications network comprising one or more network data stores, one or more network terminals and a plurality of user terminals, the method comprising:
    (a) establishing a first communications link between a user terminal and a first network terminal via said communications network;
    (b) establishing a test link between the user terminal and a second network terminal via said communications network;
    (c) transmitting a test signal over said test link;
    (d) measuring the received test signals to determine the capacity of said test link
    (e) establishing a communications link between the user terminal and the network terminal via said communications network in accordance with the result of step (d).

2. A method of operating a communications network according to claim 1 wherein the test link established in (b) is a computer telephony link between the user terminal and the network terminal.

3. A method of operating a communications network according to claim 1, wherein the test signal comprises speech or speech fragments.

4. A method of operating a communications network according to claim 1, wherein the communications link between the user terminal and the network terminal established in (e) is a computer telephony link.

5. A data carrier containing computer code for loading into a computer for the performance of the method of claim 1.

* * * * *